Sept. 14, 1954     H. BURRIS-MEYER     2,688,873
APPARATUS FOR MEASURING AND RECORDING
THE PHYSICAL ATTITUDES OF SUBJECTS
Filed Dec. 5, 1950     2 Sheets-Sheet 1
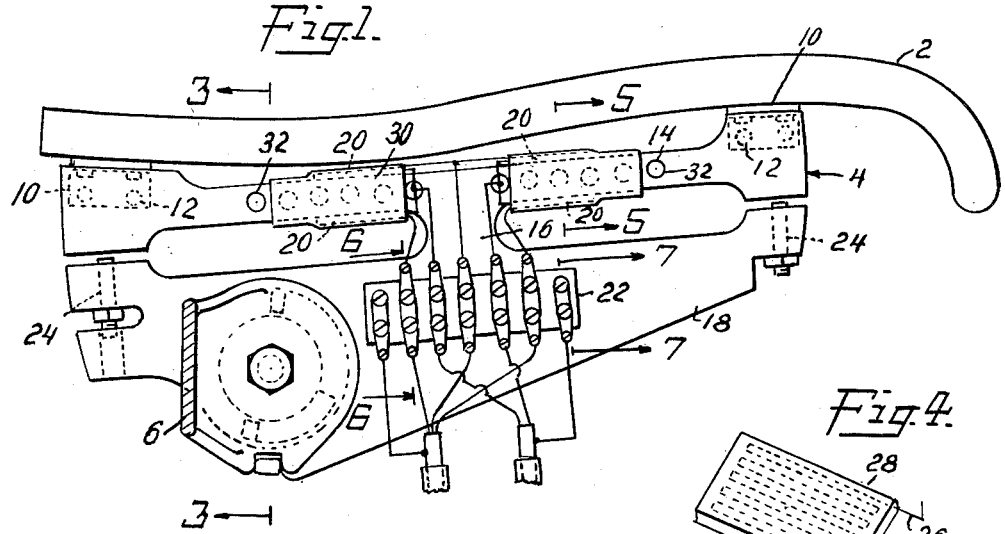
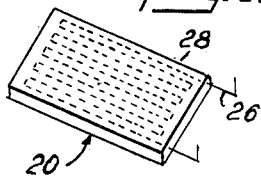
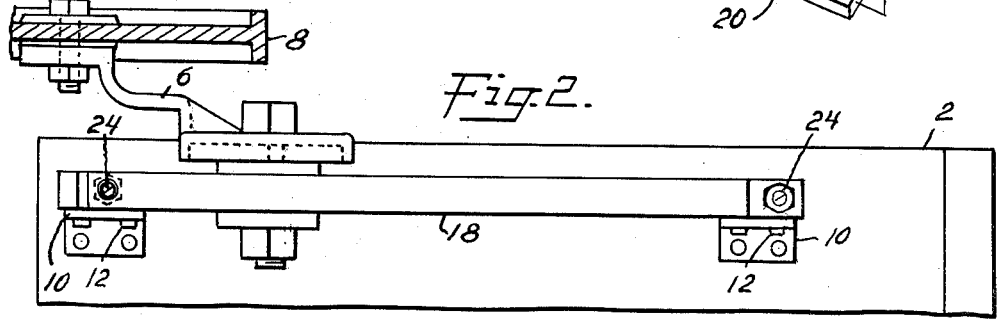
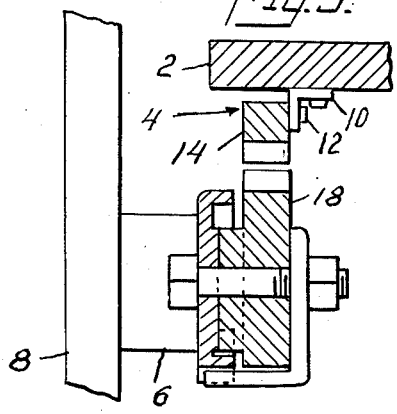
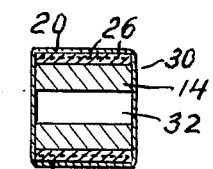
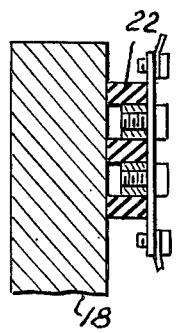
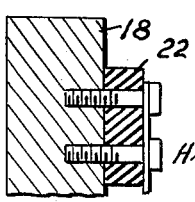
INVENTOR
HAROLD BURRIS-MEYER
BY Pennie, Edmonds,
Morton and Barrows
ATTORNEYS Sept. 14, 1954 H. BURRIS-MEYER 2,688,873
APPARATUS FOR MEASURING AND RECORDING
THE PHYSICAL ATTITUDES OF SUBJECTS
Filed Dec. 5, 1950 2 Sheets-Sheet 2

INVENTOR
HAROLD BURRIS-MEYER
BY Pennie, Edmonds,
Morton and Barrows
ATTORNEYS

Patented Sept. 14, 1954

2,688,873

UNITED STATES PATENT OFFICE 2,688,873

APPARATUS FOR MEASURING AND RECORDING THE PHYSICAL ATTITUDES OF SUBJECTS

Harold Burris-Meyer, Madison, N. J., assignor to Control, Incorporated, Jersey City, N. J., a corporation of New Jersey Application December 5, 1950, Serial No. 199,224

4 Claims. (Cl. 73—172)

This invention relates to the measurement and recording of emotional states and changes of state through measurement of a subject's bodily movement and attitudes while seated.

In the fields of psychiatry and psychology it is desired to gather data concerning the emotional responses of individuals to chosen stimuli. For such data to be reliable it is important that the measurements of emotional states, or of quantities which are indicative thereof, be made without the subject's knowledge. Accordingly, all physical apparatus connected to the subject is to be avoided.

It is now widely accepted that the physical attitudes of a subject and his motions are a reliable index of emotional state and change of state. The present invention provides means whereby motions and physical attitudes of a subject may be measured and recorded by means of apparatus so constructed and disposed that the subject may be entirely unaware of the process of measurement.

In accordance with the present invention the subject's physical attitudes and state of muscular strain are measured by means of the strains imposed by his shifting weight upon a support. Minute strains of the supporting structure are sufficient so that the subject may be entirely unaware of the course of measurement.

By way of example the invention will now be described in terms of an embodiment in which the deformable support for the subject comprises a chair such as is commonly employed in theaters. Moving pictures and the like form a convenient means for exposing a subject to a variety of chosen stimuli, and the sitting posture is advantageous because of the consequent avoidance of subject fatigue and because of the control of his whereabouts which it affords.

In the accompanying drawings Fig. 1 is a view in side elevation of the essential components of a theater seat and of the deformable beam support therefor by which the subject's movements and physical attitudes may be measured.

Fig. 2 is a partial bottom plan view of the seat of Fig. 1, showing in particular the deformable beam and its connection to the conventional seat-supporting bracket which is affixed to the floor.

Fig. 3 is a sectional view taken on line 3—3 of Fig. 1.

Fig. 4 is a perspective view of one of the strain gauges employed in conjunction with the deformable beam of Fig. 1.

Fig. 5 is a sectional view taken along the line 5—5 of Fig. 1.

Fig. 6 is a sectional view taken along the line 6—6 of Fig. 1.

Fig. 7 is a sectional view taken along the line 7—7 of Fig. 1; and

Figure 8:
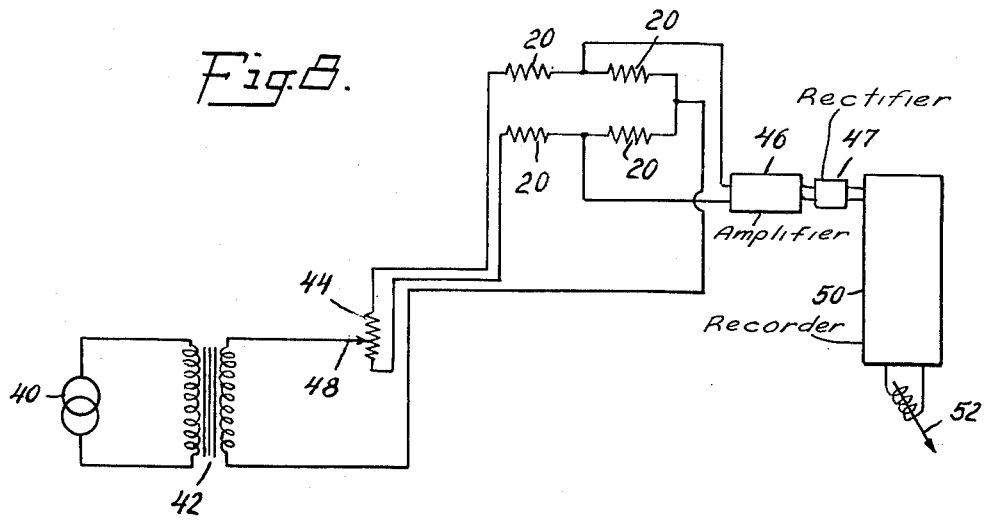
Fig. 8 is a diagram of the electric circuit associated with the theater seat of Fig. 1 for the measurement and recording of the subject's physical attitudes.

In Fig. 1 a theater seat 2 is seen supported at one side by means of a deformable beam generally indicated at 4. The beam 4 is coupled through a rotatable joint with a bracket 6 affixed to the usual floor bracket 8 (Fig. 2) resting upon the floor.

In the embodiment shown the beam is of generally H-shaped profile and makes contact with the seat 2 at two points widely spaced apart along the fore-and-aft dimension of the seat. Thus blocks 10 are affixed to the seat by suitable means and are fastened in turn to the beam by means of bolts 12 or the equivalent. The beam includes a generally horizontal bar 14 on whose extremities rest the seat and roughly one half the weight of the person occupying it. The bar 14 in turn is supported near its mid-point by a stem-shaped portion 16 of the beam which rests upon a triangular portion 18 connecting with the floor bracket of the seat (Figs. 3 and 4).

The changes in the subject's physical attitude are measured by flexure in the bar 14. The bar may be provided with a plurality of holes 32 having their axes transverse to its length and parallel to the upper and lower surfaces thereof. These holes serve to increase the flexures available from a given change in the stresses applied to the bar, and hence to increase the electrical output signal available for operation of the recording device.

The flexures of the bar are detected by strain gauges 20 and a suitable associated electrical circuit. In the example shown in Fig. 1 four strain gauges are provided, applied by means of an adhesive to the upper and lower surfaces of the bar 14 on either side of the stem portion 16. With a change in the subject's position the stress on the two ends of the bar 14 changes, and the distribution of stresses to which the strain gauges are subjected changes also. Their resistance changes accordingly, and the change in resistance is detected by an electric circuit, as will be described hereinafter.

A terminal block 22 affixed to the triangular portion 18 permits suitable electrical connections to the strain gauges, as will be further described in connection with Fig. 8. The arrangement of the terminal block 22 on the triangular portion 18 of the beam is illustrated in Fig. 6 and Fig. 7.

The bottom plan view of Fig. 2 further illustrates the blocks 10 and their affixation to the seat and to the beam. Set screws 24, also seen in Fig. 1, may be adjusted to limit the deflection of the bar 14 so as to prevent distortion thereof beyond its elastic limit.

One of the strain gauges is shown in perspective in Fig. 4. In Fig. 4 a length of wire 26 is formed into a grid affixed to a sheet 28 of insulating material. The wire may be conveniently embedded in an insulating plastic. The wire is formed of a suitable metal such that the resistance between its ends varies strongly for minute changes in its length imposed by a stretching or compression. The gauges, held by an adhesive in intimate contact with the bar undergoing flexure, may be protected by a wrapping 30.

The flexures of the bar 14 occasioned by motion of the subject in response to visual or aural stimuli presented to him are measured by means of the strain gauges 20 in connection with a circuit preferably of the form shown in Fig. 8. The gauges are here shown connected together in a Wheatstone bridge circuit. In a preferred embodiment the gauges are connected electrically so that those which are physically adjacent are also electrically adjacent in the bridge. The gauges are preferably all four of similar or identical electrical properties. If the four arms of the bridge are identical when in an unstressed condition, the bridge will be in balance, and a voltage applied to any two opposite junction points will give rise to zero voltage between the other two opposite junction points. If however the gauges are subjected to strains, the bridge will be unbalanced, and an output voltage will be available for measurement and for the operation of a recorder 50. To permit balancing of the bridge under an initial stressed condition of the beam, as when the subject first sits down, a resistance 44 is connected between two adjacent gauges. The excitation for the bridge is applied to this resistor through a movable tap 48 and to the opposite junction point.

In order to permit convenient amplification of the unbalance signal from the bridge up to the high level required to operate the recorder 50 and its pen 52, the bridge is preferably excited by an A. C. signal. An oscillator 40 produces a suitable alternating current voltage which is applied to the resistance 44 and to the opposite junction point through a transformer 42. The unbalance signal from the bridge is then amplified in an amplifier 46 and rectified in a rectifier 47 before being supplied to the recorder. The amplifier must be carefully designed and shielded inasmuch as a very high degree of amplification is necessary. A gain of $10^4$ may be required. The frequency of the oscillator 40 is not critical to the operation of the bridge, but its output may be adjusted to an optimum by means of a suitable attenuator not shown in order to obtain a maximum deflection of the pen 52 for a given (slow) change in the deflection of the bar 14.

The recorder 50 may be of the moving coil type in which a pen or stylus is coupled to the motion of a coil carrying the output of the detector 47. The coil is located in a strong magnetic field and suffers a deflection proportional to the current which it carries. Suitable mechanism may be provided to drive a record chart past the pen in a direction perpendicular to the excursions executed by the pen.

Changes in the distribution of the subject's weight along the dimension of the chair parallel to the length of the bar 14 will effect flexures of the two halves of the bar in the same sense about their junction with the stem portion 16. This will place the gauge on the top surface of one half of the bar under compression and that on the top surface of the other half under tension. Similarly one of the gauges on the lower surface of the bar will be placed under tension—that on the half of the bar whose upper surface gauge is placed under compression—and that on the lower surface of the other half will be placed in compression. To generate a maximum output signal from the four gauges, they are connected so that those which are physically adjacent are electrically adjacent also.

If it is desired to measure changes in the total vertical stress applied to the bar, as when a subject shifts his weight from right to left in a seat whose deformable bar extends fore-and-aft as in Fig. 1, the gauges should be connected to make electrically adjacent those which are physically diagonally opposite. Such a connection is required to give a maximum output signal for flexure of the two halves of the bar in opposite senses about the mid-point as will occur with a change in total vertical stress borne by the bar.

Because changes in the fore-and-aft distribution of the subject's weight are especially indicative of the degree of his response to a visual stimulus, it is advantageous to establish the bar in the fore-and-aft direction and to connect the gauges so as to make electrically adjacent those which are physically adjacent. Alternative arrangements are of course possible within the scope of the invention however. Moreover it is not necessary to employ four strain gauges. Two will suffice, or even one, although four are to be recommended because of the increased signal available therefrom.

The embodiment shown in the accompanying drawings and described hereinabove is characterized for example by a fore-and-aft orientation of the bar with respect to the seat, support of the seat in part on the bar and in part on a fixed support, and particular forms of electric circuit for detection of strain in the bar. The invention however comprehends other arrangements of a deformable bar and chair and is not limited to the details of the electric circuits shown. The scope of the invention is rather set forth in the appended claims.

I claim:

1. Apparatus for measuring and recording the physical attitudes of a subject comprising a deformable bar, means to support the bar at a point intermediate its ends, a seat resting at least in part on the ends of the bar, a strain gauge applied to the bar between the support point and one of its ends, a Wheatstone bridge including the strain gauge in an arm thereof, means to excite the bridge, and means to amplify and record the unbalance signal from the bridge.

2. Apparatus for measuring and recording the physical attitudes of a subject comprising a deformable bar, means to support the bar at a point intermediate its ends, a seat resting at least in part on the ends of the bar, a strain gauge applied to the bar between the support point and one of its ends, a Wheatstone bridge including the strain gauge in an arm thereof, means to vary the impedance in one or more arms of the bridge independently of changes in the resistance of the strain gauge, means to excite the bridge, and means to amplify and record the unbalance signal from the bridge.

3. Apparatus for measuring and recording the physical attitudes of a subject comprising a deformable bar, means to support the bar in the vicinity of its mid-point against translation and rotation, four strain gauges affixed one each to opposite surfaces of the bar on either side of its support, a seat resting at least in part on the ends of the bar, a Wheatstone bridge including one of the strain gauges in each of its arms, the strain gauges physically adjacent on the bar in electrically adjacent arms of the bridge, means to excite the bridge, and means to amplify and record the unbalance signal from the bridge.

4. Apparatus for measuring and recording the physical attitudes of a subject comprising a deformable bar, means to support the bar in the vicinity of its mid-point against translation and rotation, four strain gauges affixed one each to opposite surfaces of the bar on either side of its support, a seat resting at least in part on the ends of the bar with the fore-and-aft dimension of the seat substantially parallel to the length of the bar, a Wheatstone bridge including one of the strain gauges in each of its arms, the strain gauges physically adjacent on the bar being in electrically adjacent arms of the bridge, means to excite the bridge, and means to amplify and record the unbalance signal from the bridge.

References Cited in the file of this patent

UNITED STATES PATENTS

| Number | Name | Date |
|---|---|---|
| 1,639,411 | Mechau | Aug. 16, 1927 |
| 1,970,103 | Runaldue | Aug. 14, 1934 |
| 2,199,082 | Peters | Apr. 30, 1940 |
| 2,252,464 | Kerns | Aug. 12, 1941 |
| 2,290,387 | Schwartz | July 21, 1942 |
| 2,378,039 | Schenker | June 12, 1945 |
| 2,499,033 | Oberholtzer | Feb. 28, 1950 |
| 2,597,751 | Ruge | May 20, 1952 |

OTHER REFERENCES

Publication: "Industrial High-Speed Infrared Pyrometer," by W. S. Gorrill, in Electronics, March 1949.